(12) United States Patent
Naito

(10) Patent No.: US 10,543,450 B2
(45) Date of Patent: Jan. 28, 2020

(54) CARBON DIOXIDE RECOVERY METHOD AND RECOVERY APPARATUS

(71) Applicant: IHI Corporation, Koto-ku (JP)

(72) Inventor: Toshiyuki Naito, Tokyo (JP)

(73) Assignee: IHI Corporation, Koto-ku (JP)

( * ) Notice: Subject to any disclaimer, the term of this patent is extended or adjusted under 35 U.S.C. 154(b) by 101 days.

(21) Appl. No.: 15/966,529

(22) Filed: Apr. 30, 2018

(65) Prior Publication Data

US 2018/0243680 A1 Aug. 30, 2018

Related U.S. Application Data

(63) Continuation of application No. PCT/JP2017/000966, filed on Jan. 13, 2017.

(30) Foreign Application Priority Data

Mar. 25, 2016 (JP) .................. 2016-061153

(51) Int. Cl.
*B01D 53/047* (2006.01)
*B01D 53/26* (2006.01)
(Continued)

(52) U.S. Cl.
CPC .......... *B01D 53/047* (2013.01); *B01D 53/26* (2013.01); *B01D 53/261* (2013.01); *B01D 53/62* (2013.01);
(Continued)

(58) Field of Classification Search
CPC .... B01D 53/047; B01D 53/26; B01D 53/261; B01D 53/62; B01D 53/8625;
(Continued)

(56) References Cited

U.S. PATENT DOCUMENTS 3,221,477 A * 12/1965 Arnoldi ............... B64D 13/04
95/26
4,784,672 A * 11/1988 Sircar ................ B01D 53/0462
95/123
(Continued)

FOREIGN PATENT DOCUMENTS

FR 2 890 575 A1 3/2007
JP 2001-221429 8/2001
(Continued)

OTHER PUBLICATIONS

International Search Report dated Apr. 11, 2017 in PCT/JP2017/000966 filed Jan. 13, 2017 (with English Translation).
(Continued)

*Primary Examiner* — Frank M Lawrence, Jr.
(74) *Attorney, Agent, or Firm* — Oblon, McClelland, Maier & Neustadt, L.L.P.

(57) ABSTRACT

A carbon dioxide recovery apparatus has a separator which separates carbon dioxide from a gas by utilizing adsorption and desorption of carbon dioxide to and from an adsorbent caused by pressure fluctuation, the separator including a pressurizer which pressurizes the gas to a pressure that the adsorbent is capable of adsorbing carbon dioxide, and has a dryer having a hygroscopic agent for drying the gas. A regeneration system supplies the residual gas discharged from the separator to the dryer as a regeneration gas for regenerating the hygroscopic agent in the dryer, and the regeneration gas to be supplied to the dryer is heated by an energy converter by utilizing a pressure of a post-regeneration gas discharged by the regeneration of the hygroscopic agent.

10 Claims, 1 Drawing Sheet

(51) Int. Cl.
  *B01D 53/62* (2006.01)
  *B01D 53/96* (2006.01)
  *B01J 20/18* (2006.01)
  *B01J 20/22* (2006.01)
  *B01D 53/86* (2006.01)

(52) U.S. Cl.
  CPC ........... *B01D 53/869* (2013.01); *B01D 53/96* (2013.01); *B01J 20/18* (2013.01); *B01J 20/226* (2013.01); B01D 53/8625 (2013.01); B01D 2251/2062 (2013.01); B01D 2253/102 (2013.01); B01D 2253/104 (2013.01); B01D 2253/106 (2013.01); B01D 2253/108 (2013.01); B01D 2253/204 (2013.01); B01D 2257/404 (2013.01); B01D 2257/504 (2013.01); B01D 2257/80 (2013.01); B01D 2258/0283 (2013.01); B01D 2259/40007 (2013.01); B01D 2259/40013 (2013.01); B01D 2259/40028 (2013.01); Y02C 10/04 (2013.01); Y02C 10/08 (2013.01); Y02P 20/124 (2015.11); Y02P 20/152 (2015.11); Y02P 20/57 (2015.11)

(58) Field of Classification Search
  CPC .................. B01D 53/869; B01D 53/96; B01D 2251/2062; B01D 2253/103; B01D 2253/104; B01D 2253/106; B01D 2253/108; B01D 2253/204; B01D 2257/404; B01D 2257/504; B01D 2257/80; B01D 2258/0283; B01D 2259/40007; B01D 2259/40013; B01D 2259/40028; B01J 20/18; B01J 20/226; Y02C 10/04; Y02C 10/08; Y02P 20/124; Y02P 20/152; Y02P 20/57; C01B 32/50
  USPC ... 95/96, 98, 99, 14, 18, 115, 117, 123, 139; 96/112, 121, 126, 128, 130, 132, 134, 96/144
  See application file for complete search history.

(56) References Cited

U.S. PATENT DOCUMENTS

| | | | |
|---|---|---|---|
| 5,846,295 A | * | 12/1998 | Kalbassi ............ B01D 53/0407 95/105 |
| 7,575,624 B2 | * | 8/2009 | Cartwright ............ B01D 53/04 95/139 |
| 2010/0024476 A1 | | 2/2010 | Shah |
| 2010/0206165 A1 | | 8/2010 | Alban et al. |
| 2010/0251887 A1 | * | 10/2010 | Jain .................... B01D 53/0462 95/46 |
| 2018/0236395 A1 | * | 8/2018 | Naito .................... B01D 53/047 |
| 2019/0178574 A1 | * | 6/2019 | Naito .................... F25J 3/0266 |

FOREIGN PATENT DOCUMENTS

| | | |
|---|---|---|
| JP | 2010-184229 | 8/2010 |
| JP | 2011-529848 | 12/2011 |
| JP | 2012-110824 | 6/2012 |
| JP | 5350376 | 11/2013 |
| JP | 2016-040025 | 3/2016 |

OTHER PUBLICATIONS

Written Opinion dated Apr. 11, 2017 in PCT/JP2017/000966 filed Jan. 13, 2017.

* cited by examiner

CARBON DIOXIDE RECOVERY METHOD AND RECOVERY APPARATUS

CROSS REFERENCE TO RELATED APPLICATIONS

This application is a continuation application of International Application No. PCT/JP2017/000966, filed on Jan. 13, 2017, which claims priority of Japanese Patent Application No. 2016-061153, filed on Mar. 25, 2016, the entire contents of which are incorporated by reference herein.

BACKGROUND

Technical Field

The present disclosure relates to carbon dioxide recovery apparatus and recovery method which recover carbon dioxide from a carbon dioxide containing gas such as a combustion gas, according to a pressure swing adsorption method.

Description of the Related Art

In facilities such as thermal power plants, steelworks, and boilers, a large amount of fuel such as coal, fuel oil, and ultra-heavy oil is used. The release amount and concentration of sulfur oxides, nitrogen oxides, and carbon dioxide emitted by combustion of the fuel need to be restricted from the view point of air pollution prevention and global environment protection. In recent years, carbon dioxide has been considered as a main cause of global warming, and movements to suppress discharge thereof have become more active globally. Various studies have been vigorously made to recover and store carbon dioxide in a combustion exhaust gas and a process exhaust gas, instead of releasing it into the atmosphere. As examples of carbon dioxide recovery methods, there are known a pressure swing adsorption method, a membrane separation concentration method, and a chemical absorption method utilizing reactive absorption of a basic compound.

The pressure swing adsorption (PSA) method is a separation method in which an adsorbent having selective adsorptivity for a specific component is used to adsorb the specific component in a gas and thereby separate the specific component from the gas. The PSA method is widely known as a separation method for a mixed gas containing multiple components and can be utilized as the separation method for a mixed gas in various fields. In the PSA method, the specific component adsorbed on the adsorbent is recovered by reducing the pressure after the adsorption so as to desorb the specific component from the adsorbent, and the adsorption and the desorption are repeatedly performed. The separation efficiency of the PSA method depends on the selectivity of the adsorbent for the specific component, and the PSA method can be utilized for removing, separating, concentrating, or refining the specific component, depending on the selectivity of the adsorbent, the concentration of the specific component in a raw-material gas, and the like. Japanese Patent Application Laid-open No. 2001-221429 (Publication Document 1 in the Publication List below) has description about oxygen produced by a PSA device which is supplied to oxygen combustion equipment.

Conventionally, as a prevailing method for recovering carbon dioxide from an exhaust gas, there has been a method including removing various impurities (sulfur oxides, nitrogen oxides, chlorine, mercury, and the like) from the exhaust gas and then refining the remaining concentrated carbon dioxide by cryogenic separation (liquefaction and superfractionation), and various studies are being made to put this method to practical use.

Separation of carbon dioxide utilizing an adsorbent is described in Japanese Patent Application Laid-Open No. 2010-184229 (Publication Document 2). This literature has description about a technique in which a carrier made of mesoporous silica and carrying an element selected from Mg, Ca, Sr, Ba, Y, and La is used as the adsorbent and carbon dioxide adsorbed to the adsorbent is disrobed by heating. Meanwhile, Japanese Patent No. 5350376 (Publication Document 3) has description about that, in refining of a carbon dioxide containing gas, silica gel, zeolite, porous glass, or the like is used as an adsorbent in absorption and removal of water in the presence of sulfur oxides and nitrogen oxides.

DOCUMENTS LIST

Publication Document 1: Japanese Patent Application Laid-Open No. 2001-221429
Publication Document 2: Japanese Patent Application Laid-Open No. 2010-184229
Publication Document 3: Japanese Patent No. 5350376

BRIEF SUMMARY

In the PSA method, it is relatively easy to selectively separate carbon dioxide from an exhaust gas containing various types of impurities in addition to carbon dioxide and recover high-purity carbon dioxide. In this respect, the recovery of carbon dioxide by the PSA method is superior to the recovery method including removing the various impurities (sulfur oxides, nitrogen oxides, chlorine, mercury, and the like) from the exhaust gas and then obtaining carbon dioxide by performing cryogenic separation (liquefaction and superfractionation). Moreover, the PSA method is advantageous in that burden of maintenance dealing with corrosion in tools and devices for removing the aforementioned impurities is reduced.

In the PSA method, pressurization and depressurization for changing the pressure of the gas between an adsorption pressure and a desorption pressure are performed to cause the adsorbent to adsorb and desorb carbon dioxide, and energy is consumed for pressure control. Moreover, the exhaust gas subjected to dehumidification treatment is supplied in order to prevent inhibition of the selective adsorption ability of the adsorbent used to adsorb carbon dioxide, and the dehumidification treatment also consumes energy. Accordingly, saving energy required for these operations is important for reducing the operation cost, and it is desirable to make efforts for efficient utilization of energy.

An object of the present disclosure is to solve the aforementioned problems and provide carbon dioxide recovery method and recovery apparatus which can economically and efficiently perform processing by improving energy utilization in the case where carbon dioxide is recovered from a carbon dioxide containing gas by utilizing the pressure swing adsorption method.

As a result of earnest research made on an actual condition of exhaust gas processing to solve to the aforementioned problems, the inventors have reached a manner of effectively utilizing a pressure of a remainder gas obtained after separation of carbon dioxide and have completed the technique of the present disclosure.

According to one aspect of the present disclosure, a carbon dioxide recovery apparatus has: a separator which separates carbon dioxide from a gas by utilizing adsorption and desorption of carbon dioxide to and from an adsorbent caused by pressure fluctuation and discharges a residual gas from which carbon dioxide has been removed, the separator including a pressurizer which pressurizes the gas to a pressure at which the adsorbent is capable of adsorbing carbon dioxide; a dryer which includes a hygroscopic agent for drying the gas to be supplied to the adsorbent; a regeneration system which supplies the residual gas discharged from the separator to the dryer as a regeneration gas to be used for regeneration of the hygroscopic agent in the dryer; and an energy converter which heats the regeneration gas to be supplied to the dryer by utilizing a pressure of a post-regeneration gas discharged by the regeneration of the hygroscopic agent.

The recovery apparatus may be configured such that the energy converter includes an expander through which the post-regeneration gas flows and a compressor which cooperates with the expander and through which the regeneration gas flows, wherein expansion power of the post-regeneration gas in the expander is converted to compression power for the regeneration gas in the compressor and a temperature of the regeneration gas is increased by compression heat. Moreover, when the recovery apparatus is configured to include a heat exchanger which exchanges heat between the regeneration gas and the gas pressurized by the pressurizer, the pressurized gas is cooled by the heat exchange in the heat exchanger and supplied to the dryer and the separator, and the regeneration gas is heated by the heat exchange in the heat exchanger and supplied to the energy converter. Accordingly, the heat amount of the pressurized gas can be utilized for the regeneration of the hygroscopic agent.

Furthermore, providing a denitrator arranged between the pressurizer and the heat exchanger is effective in suppressing degradation of the adsorbent, and the denitrator may appropriately includes a catalyst which decomposes a nitrogen oxide into nitrogen by reacting the nitrogen oxide with ammonia.

Providing paired columns containing the adsorbent in the separator, it is possible to appropriately perform continuous processing of the gas. The separator includes a pressure reducer which reduces a pressure in each of the columns to a pressure at which desorption of carbon dioxide adsorbed on the adsorbent is possible. The recovery apparatus may be configured such that the pressurizer includes a compressor, the pressure reducer includes an expander, and the pressurizer and the pressure reducer cooperate with each other. This saves power consumption. Moreover, the recovery apparatus may include a heat exchanger which exchanges heat between the supplied gas and the post-regeneration gas discharged from the energy converter, and the cold can be effectively utilized.

The regeneration system may include: a detector which detects a temperature of the regeneration gas to be supplied to the dryer; and a heater which is electrically connected to the detector and which heats the regeneration gas when the temperature of the regeneration gas detected by the detector does not reach a temperature suitable for the regeneration of the hygroscopic agent. The energy consumed by the heater is reduced by the operation of the energy converter.

Moreover, according an aspect of the present disclosure, a carbon dioxide recovery method has: separation processing of separating carbon dioxide from a gas by utilizing adsorption and desorption of carbon dioxide to and from an adsorbent caused by pressure fluctuation and of discharging a residual gas from which carbon dioxide has been removed; pressurizing treatment of pressurizing the gas to be supplied to the separation processing to a pressure at which the adsorbent is capable of adsorbing carbon dioxide; drying treatment of drying the gas to be supplied to the separation processing by using a hygroscopic agent; regeneration processing of supplying the residual gas discharged in the separation processing to the drying treatment as a regeneration gas to be used for regeneration of the used hygroscopic agent; and energy conversion of heating the regeneration gas to be supplied to the drying treatment by utilizing a pressure of a post-regeneration gas discharged by the regeneration of the hygroscopic agent.

By using a metal-organic framework as the adsorbent, it is possible to eliminate a negative pressure condition and form the separator employing the PSA method without using a vacuum pump. The residual gas obtained after the processing by the PSA method can be effectively utilized as the regeneration gas in the dryer, and the utilization efficiency of energy is improved.

According to the present disclosure, the residual gas, obtained after carbon dioxide is recovered from the carbon dioxide containing gas by utilizing the pressure swing adsorption method, is used for the regeneration of the hygroscopic agent used in the drying treatment and the pressure of the residual gas is also utilized for heating in the regeneration, thereby utilization efficiency of energy is possibly improved to provide a carbon dioxide recovery method and a recovery apparatus which can economically and efficiently perform processing.

DETAILED DESCRIPTION OF EMBODIMENTS

The pressure swing adsorption (PSA) method is a method for separating and removing a specific component in a mixed gas by utilizing adsorption and desorption of the specific component to and from an adsorbent caused by pressure fluctuation, and it can be utilized to recover carbon dioxide from a carbon dioxide containing gas such as a combustion exhaust gas, by using a material capable of adsorbing carbon dioxide as the adsorbent. Increasing the pressure (pressurizing) of a gas supplied to the adsorbent to a relatively high pressure (adsorption pressure) causes the adsorbent to adsorb carbon dioxide, and reducing the pressure (depressurizing) to a relatively low pressure (desorption pressure) causes the adsorbent to desorb and release the adsorbed carbon dioxide. A carbon dioxide-removed gas and concentrated (or refined) carbon dioxide are obtained from the gas by repeating such increase and decrease of the pressure to cause the adsorbent to adsorb and desorb (release an adsorbate) carbon dioxide in the gas. In this respect, in order to prevent inhibition of selective adsorption ability of the adsorbent, it is effective to subject the gas to be supplied to the adsorbent to drying treatment in advance. A hygroscopic agent used in the drying treatment can be regenerated by being heated or by being supplied with a dry gas, so that it can be used repeatedly.

Pressure control for performing the aforementioned pressurization and depressurization consumes power energy. Accordingly, reducing the energy required for the pressure control is effective for reducing the operation cost. This can be achieved in a configuration in which energy is recovered and utilized by associating a pressurization operation and a depressurization operation with each other. Meanwhile, a residual gas from which carbon dioxide has been removed is discharged by contact between the gas and the adsorbent. Considering that the residual gas is a gas which contains substantially no moisture, the residual gas can be utilized as a regeneration gas to be used for regeneration of the hygroscopic agent used in the drying treatment. In this respect, the residual gas is a pressurized gas and, if the residual gas is released as it is, the pressure energy of the residual gas is wasted. In other words, utilization of the residual gas can be further improved from the view point of energy efficiency.

Therefore, in the present disclosure, the residual gas obtained after the separation of carbon dioxide, in the carbon dioxide recovery utilizing the separation according to the PSA method, is supplied as the regeneration gas to be used for regeneration of the hygroscopic agent for drying. And, in this case, the power energy is recovered from flow pressure generated by release of the pressure of the residual gas and is converted to pressurization energy to additionally pressurize the residual gas. Thus a carbon dioxide recovery method and a recovery apparatus configured as described above are proposed. The additional pressurization generates compression heat and the temperature of the residual gas increases. In other words, the additional pressurization is utilized as heating means. A carbon dioxide recovery method according to an embodiment of the disclosure and a carbon dioxide recovery apparatus for executing this method are described below with reference to the drawing.

Figure 1:
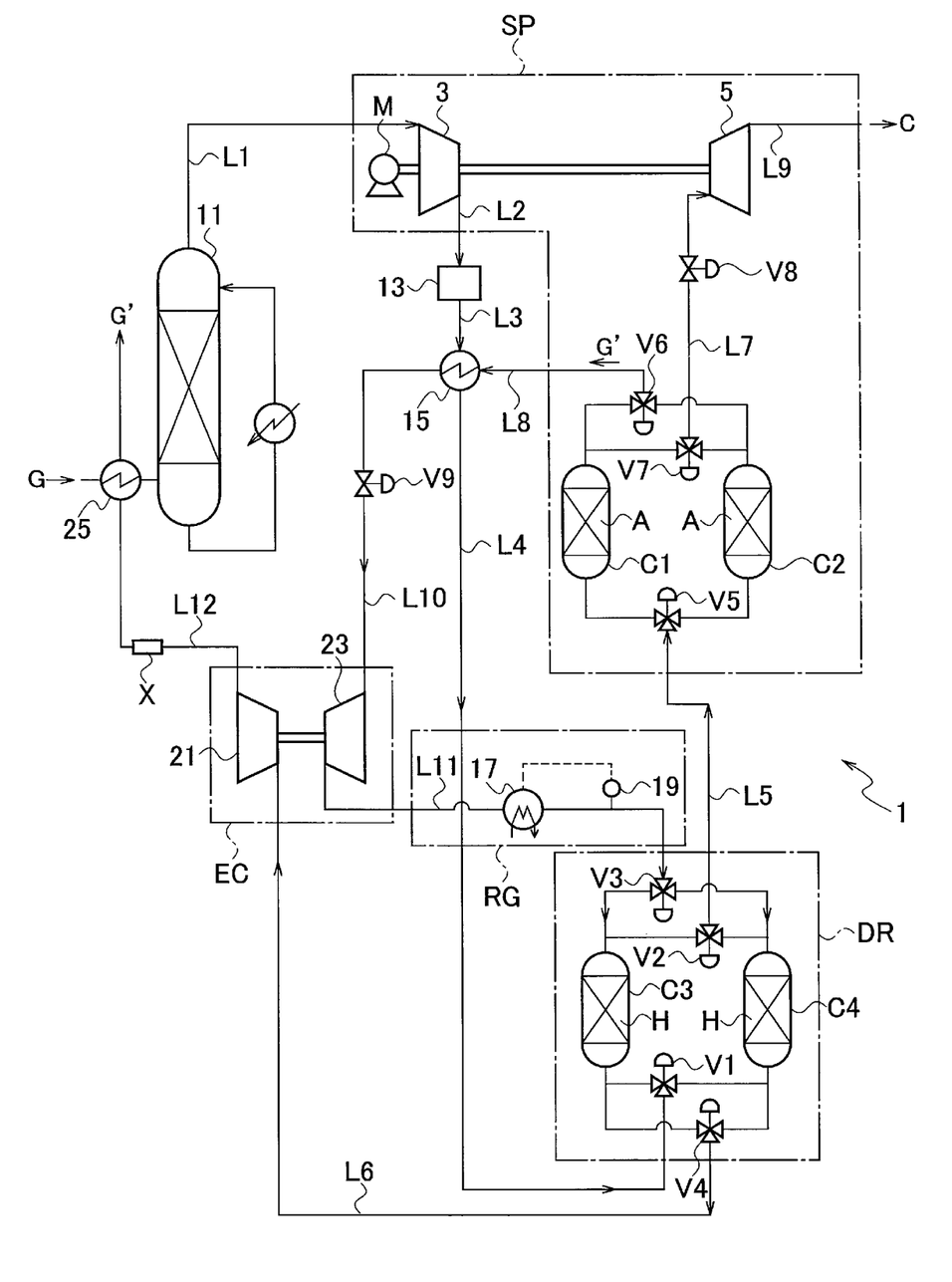
FIG. 1 is a schematic configuration diagram illustrating a carbon dioxide recovery apparatus according to one embodiment of the present disclosure.

FIG. 1 is a schematic configuration diagram illustrating an embodiment of the carbon dioxide recovery apparatus in the present disclosure. The recovery apparatus 1 has: a separator SP which includes an adsorbent A for separating carbon dioxide from a gas by using the PSA method; a dryer DR which dries the gas to be supplied to the adsorbent A; a regeneration system RG which supplies a residual gas from which carbon dioxide has been removed to the dryer DR as a regeneration gas to be used for regeneration of a hygroscopic agent H in the dryer DR; and an energy converter EC which heats the regeneration gas to be supplied to the dryer DR by utilizing the pressure of a post-regeneration gas discharged in the regeneration of the hygroscopic agent H.

The separator SP has at least one pair of columns C1, C2 containing the adsorbent A. The separator SP is also provided with a compressor 3 which serves as a pressurizer for applying to a gas G a pressure at which carbon dioxide is adsorbed to the adsorbent A, and an expander 5 which serves as a pressure reducer for reducing the pressure in the columns C1, C2 to a pressure at which carbon dioxide can be desorbed from the adsorbent A. Operations of the compressor 3 and the expander 5 can cause pressure swing in the columns C1, C2, and the adsorption and desorption of the carbon dioxide to and from the adsorbent A due to the pressure fluctuation can be utilized to separate carbon dioxide from the gas G. As a result, highly-concentrated carbon dioxide C and a residual gas G' from which carbon dioxide has been removed are discharged from the separator SP. The adsorptive separation of carbon dioxide can be performed by using a single column. However, in such a case, the gas G is intermittently supplied according to switching between the adsorption and the desorption, and the processing is intermittent. The separated carbon dioxide C and the residual gas G' can be continuously released from the separator SP by using the paired columns.

The dryer DR has the hygroscopic agent H for drying the gas G to be supplied to the separator SP. The hygroscopic agent H is contained in at least one pair of columns C3, C4. The gas G pressurized by the compressor 3 is dehumidified by the hygroscopic agent H in the dryer DR and then supplied to the separator SP. The hygroscopic agent H absorbing moisture can be regenerated by being heated or being supplied with a dry gas.

Since the gas G supplied to the separator SP is dry, the residual gas G' obtained after the removal of carbon dioxide in the separator SP contains substantially no moisture. Therefore, the residual gas G' can be used as the regeneration gas to be used for regeneration of the hygroscopic agent H in the dryer DR, and the regeneration system RG supplies the residual gas G' discharged from the separator SP to the dryer DR as the regeneration gas to be used for regeneration of the hygroscopic agent H in the dryer DR. A device for heating the residual gas G' is provided in order to increase the regeneration efficiency, and the energy converter EC is provided to reduce the energy consumed for heating the residual gas G'.

Since the residual gas G' discharged from the separator SP is maintained in the state pressurized by the compressor 3, the post-regeneration gas discharged after being used as the regeneration gas for the hygroscopic agent H in the dryer DR is also in the pressurized state. The flow pressure of the pressurized gas generated when the pressure of the pressurized gas is released can be recovered as power energy, and recovery and utilization of this energy is performed by the energy converter EC configured by combining an expander 21 and a compressor 23. The compressor 23 is connected to the expander to cooperate with the expander, and expansion power of the post-regeneration gas generated when flowing through the expander 21 is converted to power for driving the compressor 23. This power drives the compressor 23 to compress the regeneration gas flowing through the compressor 23. As a result, the temperature of the regeneration gas is increased by compression heat. That is, the energy converter EC, utilizing the pressure of the post-regeneration gas, pressurizes the regeneration gas to be supplied to the dryer DR by means of the recovered power energy, and heats the regeneration gas with the compression heat. Since the temperature increases with pressure increase, the energy required for heating the regeneration gas to a temperature suitable for the regeneration in the dryer DR is reduced. The post-regeneration gas whose temperature has fallen due to expansion can be utilized to cool, to some extent, the gas G supplied to the recovery apparatus 1, by using a heat exchanger 25 or the like.

A specific configuration of the recovery apparatus 1 in FIG. 1 is described below. It is noted that broken lines in FIG. 1 illustrate electrical connections. The recovery apparatus 1 has a cooler 11. The gas G containing carbon dioxide and discharged from combustion equipment or the like at a high temperature is first cooled to some extent in the heat exchanger 25 by heat exchange with the residual gas G' discharged from the energy converter EC as the post-regeneration gas, and is then supplied to the cooler 11. The temperature of the combustion exhaust gas at the inlet is generally about 100 to 200° C. Since the volume of the gas decreases by cooling, this makes it possible to increase the processing amount in subsequent equipment. The temperature of the residual gas G' supplied from the expander 21 to the heat exchanger 25 is reduced to about 0 to 50° C. by expansion, and the temperature of the supplied gas G is reduced to about 100° C. or less in the heat exchanger 25. The cooler 11 is equipment for cooling the gas G to a temperature suitable for processing in the subsequent equipment and is configured to cool the gas G to a temperature of about 50° C. or less, preferably about 40° C. or less at the outlet. A coolant of the cooler 11 may be any generally-used coolant such as water, air, or a coolant for refrigeration cycle. Regarding the contact with the coolant, any type of cooling may be used, such as those of direct-contact type such as spraying, gas-liquid contact using a packing, etc., those of indirect-contact type using a condenser, a heat exchanger, or the like. In this embodiment, a scrubber which cools the gas G by bringing the gas G into direct contact with cooling water is provided as the cooler 11. The direct-contact cooling using cooling water is excellent in economy and cooling efficiency and also has a function of cleaning means for removing fine solid matters such as dust and acid substances such as chlorides and sulfur oxides, from the gas G.

The cooler 11 is connected to the compressor 3 via a flow passage L1. The gas G whose temperature is adjusted to a suitable temperature by the cooler 11 is supplied to the compressor 3 to be compressed, and the pressure thereof is increased. The compressor 3 is operated by a power source M such as, for example, a motor and pressurizes the gas G to a pressure required for the adsorption of the carbon dioxide in the subsequent separator SP. Specifically, the compressor 3 applies a pressure to the gas G so that the partial pressure of the carbon dioxide in the gas G supplied to the separator SP reaches the adsorption pressure (relatively high pressure). The pressure to be applied by the compressor 3 is thus determined based on the carbon dioxide concentration in the gas G and the adsorption pressure. The adsorption pressure is appropriately set based on adsorption isotherm of carbon dioxide on the adsorbent A used in the separator SP. The pressurization pressure of the gas G is thus set, depending on the carbon dioxide concentration in the gas G, to a pressure at which the carbon dioxide partial pressure in the gas G reaches the adsorption pressure. Hence, the pressure of the pressurized gas G is expressed by the following formula: pressure=100×adsorption pressure/carbon dioxide concentration in gas G [%]. The adsorption pressure employed in the separator SP is preferably a pressure equal to or higher than a threshold indicated by the adsorption isotherm on the adsorbent and varies depending on the used adsorbent. However, the adsorption pressure can be generally set to about 0.2 to 1.0 MPa. Any pressurizing devices capable of generating flow pressure that can pressurize the gas G such that the partial pressure of carbon dioxide reaches an appropriate adsorption pressure can be used as the pressurizer, and a pressure pump, a compressor, a blower, and the like can be given as examples of such devices. Accordingly, the compressor 3 can be replaced with other pressurizing device which can pressurize the gas G such that the partial pressure of carbon dioxide in the gas G reaches the adsorption pressure. However, since a pressurizing device that the applied pressure is relatively small can be used in the PSA method as compared with the conventional method, the compressor and the blower can be preferably utilized and the compressor is most preferable. The pressure applied to the gas G by the compressor 3 can be maintained in the separator SP by providing a pressure regulating valve downstream of the separator SP. The pressure of the gas G can be adjusted by controlling the pressure regulating valve. In the embodiment, the pressurization pressure can be adjusted by using a pressure regulating valve V9 provided upstream of the compressor 23. The pressurization in the compressor 3 increases the temperature of the gas G. For example, when the gas G whose temperature is 40° C. and whose carbon dioxide concentration is 80% (volume percent) is pressurized to about 0.5 MPa, the partial pressure of carbon dioxide is about 0.4 MPa which is suitable as the adsorption pressure, and the temperature of the gas G in this case is about 190° C. When the pressurization pressure of the gas G in the compressor 3 is appropriately adjusted depending on the concentration of carbon dioxide as described above, the temperature of the gas G after the pressure increase is generally increased to about 120 to 200° C.

When nitrogen oxides are contained in the gas G, the nitrogen oxides are preferably removed as much as possible in consideration of effects on selective adsorption ability of the adsorbent A in the separator SP. For this purpose, a denitrator 13 is provided and the compressor 3 is connected to the denitrator 13 via a flow passage L2. The denitrator 13 may utilize any method appropriately selected from denitration methods generally used for denitration of exhaust gas such as dry denitration using a solid absorbent, adsorbent, or catalyst or wet denitration using an aqueous liquid containing a basic substance. For example, a catalyst which decomposes a nitrogen oxide into nitrogen by reacting the nitrogen oxide with ammonia is preferably used. Moreover, nitrogen monoxide included in the nitrogen oxides is very low in water solubility and is difficult to dissolve and remove with water alone. However, in the embodiment of FIG. 1, since the gas G is pressurized by the compressor 3, removal by dissolution into water can be performed by utilizing reaction progress caused by the pressurization. Specifically, oxidation of nitrogen monoxide progresses in the pressurized gas G and nitrogen monoxide is converted to nitrogen dioxide with high water solubility. In addition, water vapor in the gas G is condensed by the pressurization and the nitrogen oxides contained in the gas G dissolve into the condensate water as nitrogen dioxide. Accordingly, denitration processing of the gas G can be performed by separating and removing the condensate water from the pressurized gas G with use of a gas-liquid separator or the like. In this processing method, a basic substance is unnecessary and the water content of the gas G is reduced. Accordingly, the burden on the dryer DR in the subsequent stage is reduced.

The denitrator 13 is connected to a heat exchanger 15 via a flow passage L3 and the denitrated gas G is cooled in the heat exchanger 15 by the residual gas G' discharged from the separator SP. The residual gas G' is thereby heated and its temperature approaches a temperature suitable for utilization as the regeneration gas (details are described later). It is note that, in the case where the heat exchanger 15 is corrosion resistant or the gas G contains a relatively small amount of nitrogen oxides, the aforementioned denitrator 13 can be arranged in the stage subsequent to the heat exchanger 15. In that case, the amount of condensed water separated by cooling of the pressurized gas G increases. Accordingly, in the denitration using the gas-liquid separator, the water content of the gas G is reduced and the burden on the drying treatment in the dryer DR in the subsequent stage is reduced.

The heat exchanger 15 is connected to the dryer DR via a flow passage L4, and the cooled gas G is subjected to the drying treatment by the dryer DR. The dryer DR is equipment for removing moisture from the gas G to prevent damage and functional decline of the adsorbent A used in the separator SP, and is particularly important in the case where the cooler 11 and the denitrator 13 in the previous stages are configured by using a wet type device. The dryer DR has the columns C3, C4 containing the hygroscopic agent H therein. The gas G is dehumidified by being brought into contact with the hygroscopic agent H, and the gas G with low humidity is supplied to the separator SP via a flow passage L5. The hygroscopic agent H may be appropriately selected and used from commonly used desiccant materials such as silica gel, alumina gel, molecular sieve, zeolite, activated carbon and the like. A hygroscopic agent which can be easily regenerated by heating such as silica gel and the like is economically advantageous and can form a temperature swing moisture absorbing tower. Forming the dryer DR by using one pair or more of moisture absorbing columns loaded with the hygroscopic agent H enables alternate performance of moisture absorption of the gas G and the regeneration of the hygroscopic agent H in each moisture absorbing column by supplying the gas G and the high-temperature regeneration gas alternately to the moisture absorbing columns. In other words, the drying treatment and the regeneration of the hygroscopic agent H can be repeatedly and continuously performed without stopping the processing of the gas G. This is achieved by performing switching control of switching valves V1, V2, V3, V4. Controlling the switching valves V1, V2 such that the flow passages L4, L5 communicate with one of the columns C3, C4 causes the gas G supplied from the flow passage L4 to be dehumidified in the one of the columns C3, C4 and supplied to the separator SP via the flow passage L5. At this time, the connection of the switching valves V3, V4 is controlled such that the regeneration gas supplied to the dryer DR flows through the other column and is discharged from a flow passage L6. By reversing the connection of the switching valves V1, V2, V3, V4, the moisture absorption and the regeneration in the columns C3, C4 are switched. The switching valves V1, V2, V3, V4 may be configured to be automatically switched depending on the moisture concentration of the gas G discharged from the flow passage L5. For example, such a configuration can be given that a concentration sensor is provided in the flow passage L5 to be electrically connected to the switching valves V1, V2, V3, V4, and that respective switching of the switching valves V1, V2, V3, V4 is performed based on an increase in the moisture concentration detected by the concentration sensor so as to change the column communicating with the flow passage L4 and the flow passage L5.

A main portion of the separator SP is configured by the columns C1, C2 containing the adsorbent A for separating carbon dioxide from the gas according to the PSA method. Supplying the gas G causes carbon dioxide contained in the gas G to be adsorbed to the adsorbent A, and the residual gas G' with less carbon dioxide is discharged. Specifically, the gas G supplied from the dryer DR to the separator SP via the flow passage L5 is separated in the columns C1, C2 into concentrated or refined carbon dioxide C and the residual gas G' which is a de-carbon dioxide gas that carbon dioxide has been reduced or removed. The columns C1, C2 are connected to the expander 5 and a liquefier (not illustrated) via a flow passage L7 and are also connected to the dryer DR via flow passages L8, L10, L11. The residual gas G' from which carbon dioxide has been removed by the adsorbent A flows out from the column to be released from the separator SP, and is supplied to the dryer DR via the flow passages L8, L10, L11. Meanwhile, when the column is made to communicate with the flow passage L7 and the expander 5 by connection switching of the switching valves, a pressure decrease causes the carbon dioxide adsorbed on the adsorbent A to be desorbed, and the concentrated or refined carbon dioxide C is supplied to the liquefier via the flow passages L7, L9. The expander 5 is connected to cooperate with the compressor 3 and the flow pressure generated at the pressure release in the expander 5 is recovered as power and is utilized as a part of the driving force for the compressor 3. Therefore, energy consumed in the power source M of the compressor 3 can be reduced. For the connection between the expander 5 and the compressor 3, a known method such as shaft connection, integral connection, or connection via gears can be appropriately utilized. For example, such a form that a scroll compressor and a scroll expander, which are scroll type fluid machines, are used in a coaxial state can be employed.

The adsorbent A contained in the columns C1, C2 is an adsorbent capable of selectively adsorbing carbon dioxide in the PSA method. The desorption pressure for activated carbon and zeolite which are conventionally known as materials capable of adsorbing carbon dioxide is a negative pressure. Thus, a vacuum pump is necessary for desorption of carbon dioxide. In contrast, in metal-organic frameworks which are recently studied as an adsorbent, the adsorption isotherm indicating the relationship between the pressure of adsorbate and adsorption equilibrium amount is curved in an S shape and has an abrupt rising portion around a certain pressure. Accordingly, even when the pressure difference between the adsorption pressure and the desorption pressure is small, the difference in the equilibrium adsorption amount (=adsorption capacity) can be made large. In the embodiment of FIG. 1, metal-organic frameworks (MOFs) capable of selectively adsorbing carbon dioxide are usable as the adsorbent A. The metal-organic frameworks are porous materials also called porous coordination polymers (PCPs). In the metal-organic frameworks, a complex formed by coordinate bonding of metal ion and organic ligand forms a base of a framework of a porous structure, and the metal-organic frameworks function as the adsorbent by utilizing this porous structure. Examples of the metal-organic frameworks include $[Cu(4,4'\text{-dihydroxybiphenyl-3-carboxy})_2(4,4'\text{-bipyridyl})]_n$, $[Cu(PF_6^-)_2(1,2\text{-bis(4-pyridyl)ethane})]_n$, $[Cu(CF_3SO_3^-)_2(1,3\text{-bis(4-pyridyl)propane})_2]_n$, $\{[Cu(PF_6^-)(2,2\text{-bis(4-pyridyl)})]PF_6^-\}_n$, $[Cu_2(PF_6^-)_2(4,4'\text{-pyridyl})\text{propane})_2]_n$, $[Cu_2(PF_6^-)_2(\text{pyridine})_4]_n$, $[M_2(2,5\text{-dioxide-1,4-benzenedicarboxylate})]$ (wherein M in the formula is $Mg^{2+}$, $Mn^{2+}$, $Co^{2+}$, $Ni^{2+}$, $Fe^{2+}$, or $Zn^{2+}$), $[Cu(4,4'\text{-dioxidebiphenyl-3-carboxylate})_2(4,4'\text{-bipyridyl})]_n$, $[Zn_4O\ (4,4',4''\text{-(benzene-1,3,5-triyl-tris(benzene-4,1-diyl)tribenzoate})]_n$, and the like. Alternatively, the metal-organic framework with adsorptivity for carbon dioxide appropriately may be selected and utilized from commercially-available metal-organic frameworks. Multistage adsorption processing can be executed by using multiple pairs of columns. In such a case, different types of metal-organic frameworks may be used in the respective pairs to provide adsorption performances corresponding to the respective types. Some metal-organic frameworks exhibit adsorptivity for plural kinds of gases. In such metal-organic frameworks, the pressure at the threshold in the adsorption isotherm generally varies among the types of gases, and selective adsorption for carbon dioxide can be suitably carried out by appropriate pressure setting.

In each of the columns C1, C2, carbon dioxide contained in the gas G is adsorbed to the adsorbent A when the gas G is supplied at the pressure at which the partial pressure of the carbon dioxide is equal to the adsorption pressure (relatively high pressure). Meanwhile, when the pressure drops to the desorption pressure (relatively low pressure), carbon dioxide is desorbed from the adsorbent A and is released. For example, if $[Cu(4,4'\text{-dihydroxybiphenyl-3-carboxy})_2(4,4'\text{-bipyridyl})]_n$ is used as the metal-organic framework, the equilibrium adsorption amount changes abruptly around 0.25 MPa. Accordingly, it is possible to set the adsorption pressure within a higher pressure range (>0.25 MPa) and set the desorption pressure within a lower pressure range (<0.25

MPa), where the border is set at the pressure value (threshold) at which the equilibrium adsorption amount changes abruptly. Such setting can make the difference between the equilibrium adsorption amounts (=adsorption capacity) large even when the pressure difference between the adsorption pressure and the desorption pressure is small. Accordingly, load on the device due to the pressure swing between the adsorption pressure and the desorption pressure is greatly reduced from that in the conventional technique, and burden of increasing the durability of the device structure can be reduced. Moreover, since the desorption pressure can be set to the atmospheric pressure or a positive pressure (pressure higher than the atmospheric pressure) instead of a negative pressure, the adsorption pressure and the desorption pressure can be set and adjusted by using the pressure regulating valves, without using a vacuum pump. Thus, energy which will be otherwise consumed by the vacuum pump can be saved, and it is possible to eliminate a limit on processing capacity of the recovery apparatus imposed by the performance of the vacuum pump that is a problem in the conventional PSA method.

The series of operations of supplying the gas G and reducing the pressure are repeated so that the adsorption and desorption of carbon dioxide are alternately performed in the two columns C1, C2, thereby the separation of carbon dioxide from the gas G and the recovery of carbon dioxide are alternately and repeatedly performed in each column. This is achieved by performing switching control of switching valves V5, V6, V7. Controlling the switching valves V5, V6 such that the flow passage L5 and the flow passage L8 communicate with one of the columns C1, C2 causes carbon dioxide in the gas G supplied from the flow passage L5 to be adsorbed and removed in the one of the columns C1, C2 and causes the residual gas G' to be discharged from the flow passage L8. At this time, the connection of the switching valve V7 is controlled such that the other column communicates with the flow passage L7 and the expander 5. The pressure in the other column is thereby reduced to the desorption pressure and carbon dioxide is released from the adsorbent A. Thereafter, the connection of the switching valves V5, V6, V7 is reversed to switch the adsorption and the desorption in the columns C1, C2. Carbon dioxide C is thus recovered alternately from the paired columns in the separator SP via the flow passage L9 by using the gas G continuously supplied from the compressor 3 via the dryer DR. The recovered carbon dioxide C is eventually liquefied. The desorption pressure in the columns C1, C2 can be adjusted by using a pressure regulating valve V8 in the flow passage L7. The residual gas G' from which carbon dioxide has been removed is returned to the dryer DR via the flow passages L8, L10, L11. The carbon dioxide concentration in the residual gas G' in the flow passage L8 can be detected by installing a carbon dioxide concentration sensor in the flow passage L8, that is downstream of the switching valve V6. An increase in the carbon dioxide concentration due to breakthrough of the adsorbent A can be thus detected. Accordingly, when the concentration sensor is electrically connected to the switching valves V5, V6, V7 and the switching valves V5, V6, V7 are set to be automatically switched based on the detected carbon dioxide concentration, switching between the adsorption and the desorption can be performed at an optimal timing such that the adsorption capacity of the adsorbent A is effectively utilized at the maximum.

The liquefaction of carbon dioxide C can be performed by utilizing a compression device for compressing the carbon dioxide C and a cooling device using a heat exchanger, and the liquefier can be configured by using these devices. The concentrated or refined carbon dioxide C recovered in the separator SP is liquefied by being cooled to a temperature equal to or lower than the boiling curve, preferably −20 to −50° C. and by being pressurized and compressed. The liquefied carbon dioxide C is preferably prepared in a supercritical state, and liquefied carbon dioxide C generally refined to a purity of about 95 to 99% is possibly obtained.

The regeneration system RG which uses the residual gas G' discharged from the separator SP as the regeneration gas includes the flow passage L11 and a heating device for heating the residual gas G' to a high temperature. In the embodiment, the aforementioned heat exchanger 15 and the energy converter EC are configured to at least partially perform the role of the heating device. Specifically, the aforementioned heat exchanger 15 is arranged to perform heat exchange between the gas G in the flow passage L3 and the residual gas G' in the flow passage L8. Since the temperature of the gas G is increased by the pressure applied in the compressor 3, the residual gas G' released from the separator SP is heated by heat exchange through indirect contact with the high-temperature gas G in the heat exchanger 15. The heat exchanger 15 thus cools the compressed gas G in the flow passage L3 while heating the residual gas G' in the flow passage L8 by recovering and utilizing the heat of the gas G. In other words, the residual gas G' also serves as a heat medium which carries heat energy of the compressed gas G to the dryer DR. The high-temperature gas G is cooled to about 50 to 70° C. in the heat exchanger 15 and pumped to the dryer DR and the separator SP. The cooled temperature of the gas G can be about 30 to 40° C. or lower depending on the heat exchange rate of the heat exchanger 15. The residual gas G' at about 20 to 40° C. which is returned from the separator SP is heated to about 90 to 160° C. The heat exchanger 15 can be configured by using a known gas-to-gas heat exchanger. The heat exchanger 15 may be of any form such as a counterflow type, a parallel-flow type, or a crossflow type, and can be appropriately selected from, for example, a static heat exchanger, a rotary regenerative heat exchanger, a periodic flow regenerative heat exchanger, and the like. The heated residual gas G' is supplied to the columns C3, C4 as the regeneration gas and the moisture is thereby released from the used hygroscopic agent H.

The energy converter EC includes the expander 21 and the compressor 23. The expander 21 is connected to the flow passage L6, and the post-regeneration gas which is the residual gas G' containing moisture due to the regeneration of the hygroscopic agent H in the dryer DR flows to the expander 21 via the flow passage L6. The compressor 23 is connected to the flow passage L10 provided with a pressure regulating valve V9 and to the flow passage L11, and the regeneration gas (residual gas G') supplied from the heat exchanger 15 flows to the compressor 23. The compressor 23 is configured to cooperate with the expander 21 through coaxial connection, integral connection, connection via gears, or the like. The expanding power of the post-regeneration gas generated when the post-generation gas flows through the expander 21 is converted to power for driving the compressor 23 and is used as compression power for compressing the regeneration gas flowing through the compressor 23. As a result, the temperature of the regeneration gas is increased by compression heat. The energy converter EC thus pressurizes the regeneration gas to be supplied to the dryer DR by using the power energy recovered by utilizing the pressure of the post-regeneration gas and heats the regeneration gas by using the compression heat. The energy converter EC as described above can be configured by appropriately selecting and utilizing any of compressors and expanders which are generally used to form a heat pump. For example, such a form that a scroll compressor and a scroll expander, which are scroll type fluid machines, are used in a coaxial state can be employed. In a combination of such expander and compressor, a pressure increase corresponding to about 30% of the pressure difference at expansion in the expander can be obtained in the compressor. The temperature of the regeneration gas is generally increased to about 100 to 200° C. by the temperature increase due to the pressure increase, and approaches the temperature suitable for the regeneration in the dryer DR. The expander 21 is connected to the heat exchanger 25 via a flow passage L12 and the post-regeneration gas whose temperature has dropped due to expansion is utilized in the heat exchanger 25 for cooling of the gas G supplied to the recovery apparatus 1 and is then discharged to the outside. A silencer X is provided on the flow passage L12. The pressure applied to the gas G by the compressor 3 is maintained through the separator SP and the flow passage L8, and the regeneration gas is supplied to the dryer DR at a pressure further increased in the compressor 23. The pressure of the post-regeneration gas is released in the expander 21 and is reduced to the atmospheric pressure.

The regeneration system RG includes a heater 17 provided downstream of the compressor 23 as a heating device for additionally heating the residual gas G' as necessity arises. As described above, since the regeneration gas is heated in the heat exchanger 15 and the compressor 23 of the energy converter EC, the role of the heater 17 is to heat the regeneration gas and supply insufficient heat amount as necessity arises when the temperature of the regeneration gas after the compression does not reach the temperature suitable for the regeneration of the hygroscopic agent H. In this respect, a detector 19 which detects the temperature of the regeneration gas to be supplied to the dryer DR is provided downstream of the heater 17 in the flow passage L11. The heater 17 is electrically connected to the detector 19 and is controlled depending on the temperature detected by the detector 19 so as to heat the regeneration gas when the temperature of the regeneration gas detected by the detector 19 is lower than a predetermined temperature. The regeneration gas supplied to the dryer DR is a high-temperature dry gas whose temperature is about 150 to 200° C. and which contains almost no moisture and has a dew point of about −90 to −60° C.

The flow rate of the residual gas G' discharged from the separator SP is lower than the flow rate of the gas G supplied to the recovery apparatus 1 by an amount corresponding to the recovered carbon dioxide C. In other words, the larger the amount of carbon dioxide contained in the gas G is, the lower the flow rate of the regeneration gas or the residual gas G' is. When the flow rate of the regeneration gas falls greatly, the time required for the regeneration of the hygroscopic agent becomes longer. Accordingly, there may be a case where it is difficult to sufficiently make use of the moisture absorption capacity of the hygroscopic agent. The configuration of the recovery apparatus 1 can be changed to handle such cases. For example, the configuration may be such that a line for supplying a supplement gas from the outside is connected to the flow passage LS so as to allow replenishment of shortage in the residual gas G' as the regeneration gas from the outside, and that an appropriate amount of the supplement gas can be added to the residual gas G' by using a flow rate adjustment valve or the like. As the supplement gas, there is preferably used a gas with a moisture content usable for the regeneration of the hygroscopic agent H, for example, a nitrogen gas discharged from an oxygen production equipment (ASU: air separation unit) or the like. Such a configuration can constantly maintain the supply flow rate of the regeneration gas at a predetermined rate, and is thus effective in stabilizing the regeneration processing.

If the gas G to be supplied to the aforementioned recovery apparatus 1 is already subjected to water cleaning processing or cooling processing in the other equipment and requires no cooling or removable of undesirable matters, the cooler 11 and the heat exchanger 25 may be omitted. When the cooling of the gas G needs to be enhanced from the view point of achieving the appropriate temperature in the dryer DR and the separator SP, a cooler is preferably added at an appropriate position such as on the flow passage L4 or the flow passage L5 downstream of the heat exchanger 15. Then a water-cooled cooler which uses cooling water at about 5 to 25° C. as coolant can be used to cool the gas G c to a temperature of about 20 to 30° C. or lower.

Moreover, the number of columns containing the hygroscopic agent H in the dryer DR may be appropriately changed depending on the moisture absorption rate, the moisture absorption capacity, the regeneration rate, and the like of the used hygroscopic agent H so as to perform appropriate drying treatment. The separator SP may also have a multistage configuration in which the number of pairs of columns is increased to increase the number of stages of adsorption-desorption processing depending on the separation selectivity of the adsorbent A. This can improve the purity of the recovered carbon dioxide. For example, when a pair of columns similar to the columns C1, C2 is additionally provided on the flow passage L7, the separation performance is improved by adsorptive separation in the second stage. In this case, the residual gas separated from carbon dioxide in the second-stage columns can be preferably returned to adsorptive separation processing in the first-stage columns.

Alternatively, the configuration may be such that a concentration sensor is provided in the flow passage L9 as a detector which detects the carbon dioxide concentration and the recovered carbon dioxide C is returned to the flow passage L5 when the concentration of the recovered carbon dioxide C is low. Low-concentration carbon dioxide is thereby supplied to the columns C1, C2 together with the gas G and the concentration of carbon dioxide obtained from the pair of columns can be increased.

In the aforementioned configuration, a computation processing device such as a CPU may be utilized to manage information detected by the detectors and the sensors while performing automatic control of the switching valves based on the detected information. This enables complex processing such as operation correction through compensation based on the detected information, abnormality response, and the like.

The carbon dioxide recovery method performed in the recovery apparatus 1 configured as described above includes separation processing, drying treatment, regeneration processing, and energy conversion, as main processing. In the separation processing, carbon dioxide is separated from the gas by utilizing the adsorption and desorption of carbon dioxide to and from the adsorbent due to the pressure fluctuation, and the residual gas from which carbon dioxide has been removed is discharged. In the drying treatment, the gas to be supplied to the separation processing is dried by using the hygroscopic agent. In the regeneration processing, the residual gas discharged in the separation processing is supplied to the hygroscopic agent used in the drying treatment, as the regeneration gas to be used for regeneration of the hygroscopic agent. In the energy conversion, the regeneration gas to be supplied to the drying treatment is heated by utilizing the pressure of the post-regeneration gas discharged in the regeneration processing of the hygroscopic agent. In detail, the following operations are performed.

The gas G to be supplied is subjected to the cooling processing in the heat exchanger 25 and the cooler 11 in advance, to be cooled to a temperature of about 50° C. or lower, preferably about 40° C. or lower, and it is then subjected to the pressurizing treatment in the compressor 3 to be compressed to the pressure at which the separation of carbon dioxide is performed (pressure at which the partial pressure of carbon dioxide in the gas G reaches the adsorption pressure (relatively high pressure)). The pressure generally employed in this pressurization is a pressure such that the adsorption pressure (partial pressure of carbon dioxide) is about 0.3 to 0.6 MPa. The temperature of the pressurized gas G is increased to about 120 to 180° C. and the gas G is subjected to the denitration processing in the denitrator 13 and the cooling by the heat exchanger 15 before being subjected to the separation processing using the adsorbent, so that the temperature is decreased to about 50° C. or lower, preferably about 40° C. or lower, more preferably about 30° C. or lower. Thereafter, the gas G is subjected to the drying treatment by the dryer DR and the moisture content thereof is reduced to about 1 ppm or less.

The gas G passed through the drying treatment is subjected to the adsorption of carbon dioxide using the adsorbent A in the separator SP and is thereby separated into carbon dioxide C and the residual gas G' (separation processing). The adsorption reaction in which the metal-organic framework adsorbs carbon dioxide is an exothermic reaction and the desorption reaction is an endothermic reaction. Accordingly, the temperature may fluctuate by 20° C. at the maximum due to repeating of the adsorption and the desorption. Thus, in order to achieve quick adsorption of carbon dioxide, it is desirable to maintain the temperature in the adsorption at a low temperature. The gas G to be supplied to the columns C1, C2 in the separation processing is cooled in advance in the heat exchanger 15 as described above. However, if the temperature of the gas G is higher than the temperature suitable for the separation processing, the gas G may be preferably cooled as necessary by utilizing an appropriate cooler provided in the stage prior to the separation processing. The cooling method of the gas G in this case is not limited to a particular method provided that the method involves no humidification, and a method appropriately selected from well-known indirect contact cooling techniques such as water cooling and air cooling may be suitably employed. The gas G can be cooled in an excellent manner by performing water cooling.

In the separation processing, for example, when the gas G with a carbon dioxide concentration of 60%, a temperature of 20° C., and a pressure of 0.6 MPa is supplied to one of the columns C1, C2, the adsorption of carbon dioxide starts at the adsorption pressure of 0.36 MPa. The gas released from this column is discharged via the flow passage L8 as the residual gas G'. The carbon dioxide concentration of the residual gas is extremely low until the adsorption amount of the carbon dioxide approaches the adsorption capacity of the adsorbent A. When the adsorbent A approaches the breakthrough (adsorption saturation), the adsorption rate decreases and the carbon dioxide concentration in the residual gas G' thereby starts to increase. When the adsorbent A reaches the breakthrough, the carbon dioxide concentration of the residual gas G' reaches 60% that is the original carbon dioxide concentration. In the other column, the carbon dioxide adsorbed on the adsorbent A is released by depressurization to the desorption pressure. The pressure is controlled to the desorption pressure of about 0.2 MPa by the pressure regulating valve V8. The concentration of carbon dioxide discharged from the column to the flow passage L7 is increased from 60% by the desorption of carbon dioxide from the adsorbent A, and concentrated carbon dioxide C is recovered from the flow passage L9. It is noted that, since the temperature of the adsorbent A falls due to the endothermic reaction in the desorption, the temperature inside the adsorbent A in the adsorption becomes higher than that in the desorption even when the supplied gas G is cooled to a constant temperature. Hence, the rate at which the adsorbent A takes in carbon dioxide in the adsorption is higher than the rate of release in the desorption and can be generally about 1.2 times the rate of release. Accordingly, the release of carbon dioxide from the adsorbent A on the desorption side substantially continues until the adsorbent A on the adsorption side reaches the breakthrough.

In the separation processing, the carbon dioxide concentration in the gas released from the adsorbent in the desorption can rise from the carbon dioxide concentration of the gas G and reach a purity of 95% (volume percent) or more. For example, in the case where the carbon dioxide concentration in the gas G is about 60% or more, carbon dioxide C concentrated or refined to a concentration of about 90 to 99% can be generally recovered. The configuration may be such that low-concentration carbon dioxide in an initial stage of the desorption is not recovered and the carbon dioxide C is recovered when the concentration of the desorbed carbon dioxide C reaches or exceeds a predetermined concentration. The recovered carbon dioxide is subjected to liquefaction processing as necessary.

As described above, the adsorption and the desorption of carbon dioxide are alternately repeated in the columns C1, C2, and the residual gas G' with a reduced carbon dioxide concentration and the desorbed carbon dioxide C are alternately and repeatedly released from each column. The residual gas G' separated and discharged in the separation processing is used in the regeneration processing as the regeneration gas for the hygroscopic agent used in the drying treatment. When the supplement gas is supplied from the outside depending on the flow rate of the residual gas G' in order to maintain the flow rate of the regeneration gas at a certain rate, the supply of the supplement gas is preferably performed just after the discharge of the residual gas G' in the separation processing. The regeneration gas is heated to about 90 to 160° C. by exchanging heat with the pressurized gas G yet to be subjected to the drying treatment.

The pressure and temperature of the regeneration gas are increased by the energy conversion and the regeneration gas becomes the high-temperature dry gas whose temperature is about 150 to 200° C. and which contains almost no moisture and has a dew point of about −90 to −60° C. The pressure of the regeneration gas supplied to the compressor 23 at a pressure of about 0.5 to 1 MPa is increased to about 1 to 1.5 MPa. The regeneration processing of the hygroscopic agent H used in the drying treatment is performed by using this regeneration gas. Since the heat of the pressurized gas G is recovered and utilized as regeneration heat for the hygroscopic agent, the configuration of the present disclosure is excellent in terms of energy utilization efficiency.

After the regeneration processing, the post-regeneration gas containing moisture is discharged. The post-regeneration gas is expanded and depressurized by the expander 21 to the atmospheric pressure in the energy converter EC, and the temperature thereof falls to about 0 to 50° C. The post-regeneration gas is supplied to the heat exchanger 25 to cool the gas G supplied to the recovery apparatus 1 by heat exchange with the gas G. The post-regeneration gas after the heat exchange is discharged to the outside.

The composition of the combustion exhaust gas varies depending on a fuel and a combustion method. The exhaust gas generated by oxygen combustion generally contains about 80% of carbon dioxide, about 10% of nitrogen, and about 10% of oxygen (volume percentages) and, in addition to these, may contain a small amount of water vapor and impurities such as sulfur oxides, nitrogen oxides, chlorine, and mercury. When such a combustion gas is processed in the recovery apparatus 1 as the gas G, carbon dioxide concentrated to a high concentration of about 98% or more can be recovered from the separator SP provided with the metal-organic framework as the adsorbent. Since water vapor and nitrogen oxides are removed from the gas G supplied to the separator SP by flowing through the denitrator 13 and the dryer DR, the residual gas G' discharged from the separator SP contains almost no water vapor and is suitable for use as the regeneration gas in the dryer DR.

Carbon dioxide concentrated or refined to a high purity can be recovered by performing the adsorptive separation of carbon dioxide by using the metal-organic framework with high selective adsorptivity for carbon dioxide. Accordingly, the technique of the present disclosure may be applied to carbon dioxide containing gases other than the exhaust gas. Moreover, the present technique can be utilized for refining of carbon dioxide by utilizing the point that high-purity carbon dioxide can be obtained. If the carbon dioxide concentration of the gas G is low, the recovery apparatus 1 can handle it by increasing the pressure applied in the compressor 3 such that the partial pressure of carbon dioxide in the gas G suitably reaches the adsorption pressure. However, when the pressure of the gas G is increased, the partial pressures of other components (nitrogen, oxygen, and the like) contained in the gas G also increase. Accordingly, adsorption of the other components may progress. In consideration of this, the pressure of the gas G is set within such a range that the adsorption equilibriums of the other components at the partial pressures of the other components are small.

The configurations of the separator SP and the separation processing can be changed appropriately depending on the condition. For example, the configurations may be changed such that carbon dioxide released from the desorption side with a concentration less than a predetermined concentration is temporarily collected in a storage container and is then separately subjected to another separation processing. Moreover, when the selective adsorptivity of the used metal-organic framework for carbon dioxide is relatively low, the separation processing with the paired columns can be performed in multiple stages as described above to concentrate or refine carbon dioxide and increase the purity thereof. Moreover, multiple pairs of columns may be arranged in parallel to increase the processing capacity of the gas.

Furthermore, changes relating to the fluctuation of the internal temperature of the adsorbent A due to adsorption and desorption can be made to the separator SP. Specifically, piping for indirect heat exchange can be arranged inside the adsorbent A in the columns to cause a heat medium to flow through the piping, or a heat storing material can be disposed inside the adsorbent A. Heating and cooling by the heat medium or absorbing and releasing of heat by the heat storage material can suppress the temperature fluctuation in the adsorbent A. Alternatively, instead of arranging the piping inside the adsorbent A, the separator SP may be changed such at a jacked covering an outer periphery of the adsorption tower is provided so as to heat or cool the adsorbent A from the outside by making a flow of a heat medium through the jacket. The separator SP having such a configuration can handle abrupt temperature fluctuation and suppress, from inside, the temperature rise of the adsorbent A caused by heat actively generated in the adsorption, for example, when the separator SP is employed for refining of relatively high-concentration carbon dioxide.

In the case of separating carbon dioxide from a gas whose nitrogen concentration is high and whose carbon dioxide concentration is relatively low, the configuration may be changed such that the gas is subjected to preprocessing in which the carbon dioxide concentration in the gas is increased in advance by subjecting the gas to adsorption processing using an adsorbent with selective adsorptivity for nitrogen such as crystalline hydrous aluminosilicate alkaline earth metal salt (zeolite). In this case, the nitrogen adsorbed in the preprocessing can be recovered and utilized as the supplement gas from the outside in the regeneration of the hygroscopic agent H.

According to the present disclosure, an economically-advantageous carbon dioxide recovery technique is provided, in which carbon dioxide contained in a mixed gas such as a combustion exhaust gas and a process exhaust gas is adsorbed and separated by using the PSA method to efficiently produce carbon dioxide concentrated or refined to high concentration and in which means for generating a negative pressure such as a vacuum pump is not necessary in the apparatus configuration. In the regeneration of the hygroscopic agent used to dry the gas, the energy supply required for the regeneration can be saved by recovering and utilizing the pressure of the gas discharged after the regeneration. Accordingly, the present disclosure provides a processing technique of carbon dioxide containing gas with high utility as a comprehensive exhaust gas treatment in combustion facilities such as thermal power plants, ironworks, and boilers, and can contribute to development of an energy supply technology taking in account of energy saving and environmental protection. The present disclosure can be easily implemented by using general equipment without using special or expensive equipment. This is economically advantageous and improves the versatility of the carbon dioxide recovery method using the PSA method, which is effective in increasing the field of application.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. A carbon dioxide recovery apparatus comprising:
   a separator which separates carbon dioxide from a gas by utilizing adsorption and desorption of carbon dioxide to and from an adsorbent caused by pressure fluctuation and discharges a residual gas from which carbon dioxide has been removed, the separator including a pressurizer which pressurizes the gas to a pressure at which the adsorbent is capable of adsorbing carbon dioxide;
   a dryer having a hygroscopic agent for drying the gas to be supplied to the adsorbent;
   a regeneration system which supplies the residual gas discharged from the separator to the dryer as a regeneration gas to be used for regeneration of the hygroscopic agent in the dryer; and an energy converter which heats the regeneration gas to be supplied to the dryer by utilizing a pressure of a post-regeneration gas discharged by the regeneration of the hygroscopic agent.

2. The carbon dioxide recovery apparatus according to claim 1, wherein the energy converter includes an expander through which the post-regeneration gas flows, and a compressor which cooperates with the expander and through which the regeneration gas flows, wherein expansion power of the post-regeneration gas in the expander is converted to compression power for the regeneration gas in the compressor so that a temperature of the regeneration gas is increased by compression heat.

3. The carbon dioxide recovery apparatus according to claim 1, wherein the adsorbent in the separator has a metal-organic framework.

4. The carbon dioxide recovery apparatus according to claim 1, further comprising a heat exchanger which exchanges heat between the regeneration gas and the gas pressurized by the pressurizer, wherein the pressurized gas is cooled by the heat exchange in the heat exchanger and supplied to the dryer and the separator, and the regeneration gas is heated by the heat exchange in the heat exchanger and supplied to the energy converter.

5. The carbon dioxide recovery apparatus according to claim 4, further comprising a denitrator arranged between the pressurizer and the heat exchanger, wherein the denitrator includes a catalyst which decomposes a nitrogen oxide into nitrogen by reacting the nitrogen oxide with ammonia.

6. The carbon dioxide recovery apparatus according to claim 1, wherein the separator has paired columns which contain the adsorbent, and a pressure reducer which reduces a pressure in each of the columns to a pressure at which desorption of carbon dioxide adsorbed on the adsorbent is possible.

7. The carbon dioxide recovery apparatus according to claim 6, wherein the pressurizer includes a compressor, and the pressure reducer includes an expander, wherein the pressurizer and the pressure reducer are configured to cooperate.

8. The carbon dioxide recovery apparatus according to claim 1, further comprising a heat exchanger which exchanges heat between the supplied gas and the post-regeneration gas discharged from the energy converter.

9. The carbon dioxide recovery apparatus according to claim 1, wherein the regeneration system has:

a detector which detects a temperature of the regeneration gas to be supplied to the dryer; and a heater which is electrically connected to the detector and which heats the regeneration gas when the temperature of the regeneration gas detected by the detector does not reach a temperature suitable for the regeneration of the hygroscopic agent.

10. A carbon dioxide recovery method comprising:

separation processing of separating carbon dioxide from a gas by utilizing adsorption and desorption of carbon dioxide to and from an adsorbent caused by pressure fluctuation and of discharging a residual gas from which carbon dioxide has been removed;

pressurizing treatment of pressurizing the gas to be supplied to the separation processing to a pressure at which the adsorbent is capable of adsorbing carbon dioxide;

drying treatment of drying the gas to be supplied to the separation processing by using a hygroscopic agent;

regeneration processing of supplying the residual gas discharged in the separation processing to the drying treatment as a regeneration gas to be used for regeneration of the used hygroscopic agent; and energy conversion of heating the regeneration gas to be supplied to the drying treatment by utilizing a pressure of a post-regeneration gas discharged by the regeneration of the hygroscopic agent.

* * * * *